United States Patent
Hyzin

(10) Patent No.: US 9,528,646 B2
(45) Date of Patent: Dec. 27, 2016

(54) LOCKING AND RATCHETING CONNECTOR

(71) Applicant: ITT Manufacturing Enterprises, LLC, Wilmington, DE (US)

(72) Inventor: Peter J. Hyzin, Coto de Caza, CA (US)

(73) Assignee: ITT Manufacturing Enterprises, LLC, Wilmington, DE (US)

(*) Notice: Subject to any disclaimer, the term of this patent is extended or adjusted under 35 U.S.C. 154(b) by 57 days.

(21) Appl. No.: 14/268,293

(22) Filed: May 2, 2014

(65) Prior Publication Data
US 2015/0316087 A1    Nov. 5, 2015

(51) Int. Cl.
| | |
|---|---|
| *F16L 37/10* | (2006.01) |
| *F16L 19/00* | (2006.01) |
| *H01R 13/622* | (2006.01) |
| *H02G 3/06* | (2006.01) |
| *H01R 13/639* | (2006.01) |
| *H01R 13/533* | (2006.01) |

(52) U.S. Cl.
CPC .............. *F16L 37/10* (2013.01); *F16L 19/005* (2013.01); *H01R 13/622* (2013.01); *H02G 3/0691* (2013.01); *F16L 2201/20* (2013.01); *H01R 13/533* (2013.01); *H01R 13/639* (2013.01); *Y10T 403/602* (2015.01)

(58) Field of Classification Search
CPC ... H01R 13/622; H01R 13/639; H01R 13/533; Y10T 403/29; Y10T 403/295; Y10T 403/299; Y10T 403/32434; Y10T 403/67; Y10T 403/7005; Y10T 403/7007; Y10T 403/7009; F16B 21/06; F16L 37/10; F16L 19/005
See application file for complete search history.

(56) References Cited

U.S. PATENT DOCUMENTS

| | | | |
|---|---|---|---|
| 2,728,895 A | 12/1955 | Quackenbush |
| 3,478,302 A | 11/1969 | Chirumbolo |
| 3,917,373 A | 11/1975 | Peterson |
| 3,971,614 A | 7/1976 | Paoli et al. |

(Continued)

FOREIGN PATENT DOCUMENTS

| | | |
|---|---|---|
| CA | 2720337 | 5/2011 |
| CA | 2742222 | 12/2011 |

(Continued)

OTHER PUBLICATIONS

Extended European Search Report issued in EP Application No. 15165982.8, dated Dec. 2, 2015.

*Primary Examiner* — Matthieu Setliff
(74) *Attorney, Agent, or Firm* — RatnerPrestia

(57) ABSTRACT

A connector includes a connector body, a first sleeve rotatably coupled to the connector body, and a second sleeve receiving the first sleeve and being movable axially between an engaged position and a disengaged position. The second sleeve has a plurality of teeth extending from a surface thereof. A ratchet ring is positioned on the connector body, and the ratchet ring has a plurality of teeth corresponding to the plurality of teeth of the second sleeve. A biasing member is provided for biasing the second sleeve to the engaged position. The teeth of the ratchet ring engage the teeth of the second sleeve when the second sleeve is in the engaged position, and the teeth of second sleeve are spaced from the teeth of the ratchet ring when the second sleeve is in the disengaged position.

19 Claims, 6 Drawing Sheets

(56) References Cited

U.S. PATENT DOCUMENTS

| | | | |
|---|---|---|---|
| 4,536,048 | A | 8/1985 | Schildkraut et al. |
| 4,648,671 | A | 3/1987 | Torban et al. |
| 4,820,184 | A | 4/1989 | Brandes |
| 5,145,394 | A | 9/1992 | Hager |
| 5,246,379 | A | 9/1993 | Wright |
| 5,399,096 | A | 3/1995 | Quillet et al. |
| 5,653,605 | A | 8/1997 | Woehl et al. |
| 5,681,177 | A | 10/1997 | Mikolaicyk et al. |
| 5,957,716 | A | 9/1999 | Buckley et al. |
| 6,086,400 | A | 7/2000 | Fowler |
| 6,123,563 | A | 9/2000 | Johnson et al. |
| 6,152,753 | A | 11/2000 | Johnson et al. |
| 6,293,595 | B1 | 9/2001 | Marc et al. |
| 7,032,931 | B2 | 4/2006 | Austin |
| 7,625,226 | B1 | 12/2009 | Gastineau |
| 7,806,621 | B2 | 10/2010 | Leroyer |
| 7,845,963 | B2 | 12/2010 | Gastineau |
| 7,905,741 | B1 * | 3/2011 | Wade .................. H01R 13/622 439/321 |
| 7,914,311 | B1 | 3/2011 | Gallusser et al. |
| 8,235,741 | B2 | 8/2012 | Schulze |
| 8,579,644 | B2 | 11/2013 | Cole et al. |
| 2013/0244466 | A1 | 9/2013 | Cole |

FOREIGN PATENT DOCUMENTS

| | | |
|---|---|---|
| DE | 102008007257 | 12/2008 |
| EP | 1133018 | 9/2001 |
| EP | 2325951 | 5/2011 |
| EP | 2395609 | 12/2011 |
| EP | 2503650 | 9/2012 |
| WO | WO 2013/138342 | 9/2013 |

\* cited by examiner

LOCKING AND RATCHETING CONNECTOR

FIELD OF THE INVENTION

The present invention relates to a locking and ratcheting connector.

BACKGROUND OF THE INVENTION

Connectors can be susceptible to uncoupling due to vibration or other external forces. Disclosed herein is a connector that is capable of withstanding vibration or other external forces without uncoupling from another connector.

SUMMARY OF THE INVENTION

According to one aspect of the invention, a connector for releasably connecting with a mating connector, comprises a connector body; a first sleeve rotatably coupled to said connector body and including means for connecting with the mating connector; a second sleeve receiving said first sleeve and being movable axially between an engaged position and a disengaged position, said second sleeve having a plurality of teeth extending from a surface thereof; a ratchet ring positioned on said connector body, said ratchet ring having a plurality of teeth corresponding to said plurality of teeth of said second sleeve; and a biasing member biasing said second sleeve to said engaged position, wherein said teeth of said ratchet ring engage said teeth of said second sleeve when said second sleeve is in said engaged position such that said first and second sleeves are not rotatable with respect to said connector body in at least one rotational direction, and said teeth of second sleeve being spaced from said teeth of said ratchet ring when said second sleeve is in said disengaged position such that said first and second sleeves are rotatable with respect to said connector body and the mating connector in two rotational directions.

According to another aspect of the invention, a connector comprises a connector body; a first sleeve rotatably coupled to said connector body; a second sleeve defining an interior space in which said first sleeve is positioned, said second sleeve being movable axially with respect to said connector body between an engaged position and a disengaged position, said second sleeve having a plurality of teeth extending from a surface thereof; a ratchet ring positioned on said connector body, said ratchet ring having a plurality of teeth corresponding to said plurality of teeth of said second sleeve; and a biasing member biasing said second sleeve to said engaged position, wherein said teeth of said ratchet ring engage said teeth of said second sleeve when said second sleeve is in said engaged position thereby preventing rotation of said first and second sleeves with respect to the connector body in at least one rotational direction, wherein to move said second sleeve from said engaged position to said disengaged position, in which the first and second sleeves are rotatable with respect to the connector body in two different rotational directions, said second sleeve is moved away from said ratchet ring to separate said teeth of said second sleeve from said teeth of said ratchet ring.

According to yet another aspect of the invention, a connector comprises a connector body; a first sleeve rotatably coupled to said connector body; a second sleeve defining an interior space in which said first sleeve is positioned, said second sleeve being movable axially with respect to said connector body between an engaged position and a disengaged position, said second sleeve having a plurality of teeth extending from a surface thereof; a ratchet ring arranged on said connector body such that the ratchet ring is axially fixed and non-rotatable with respect to said connector body, said ratchet ring having a plurality of teeth corresponding to said plurality of teeth of said second sleeve; and a biasing member biasing said second sleeve to said engaged position, wherein said teeth of said ratchet ring engage said teeth of said second sleeve when said second sleeve is in said engaged position, and said teeth of second sleeve being spaced from said teeth of said ratchet ring when said second sleeve is in said disengaged position.

BRIEF DESCRIPTION OF THE DRAWINGS

The invention is best understood from the following detailed description when read in connection with the accompanying drawings, with like elements having the same reference numerals. Included in the drawings are the following figures.

DETAILED DESCRIPTION OF THE INVENTION

Figure 10:
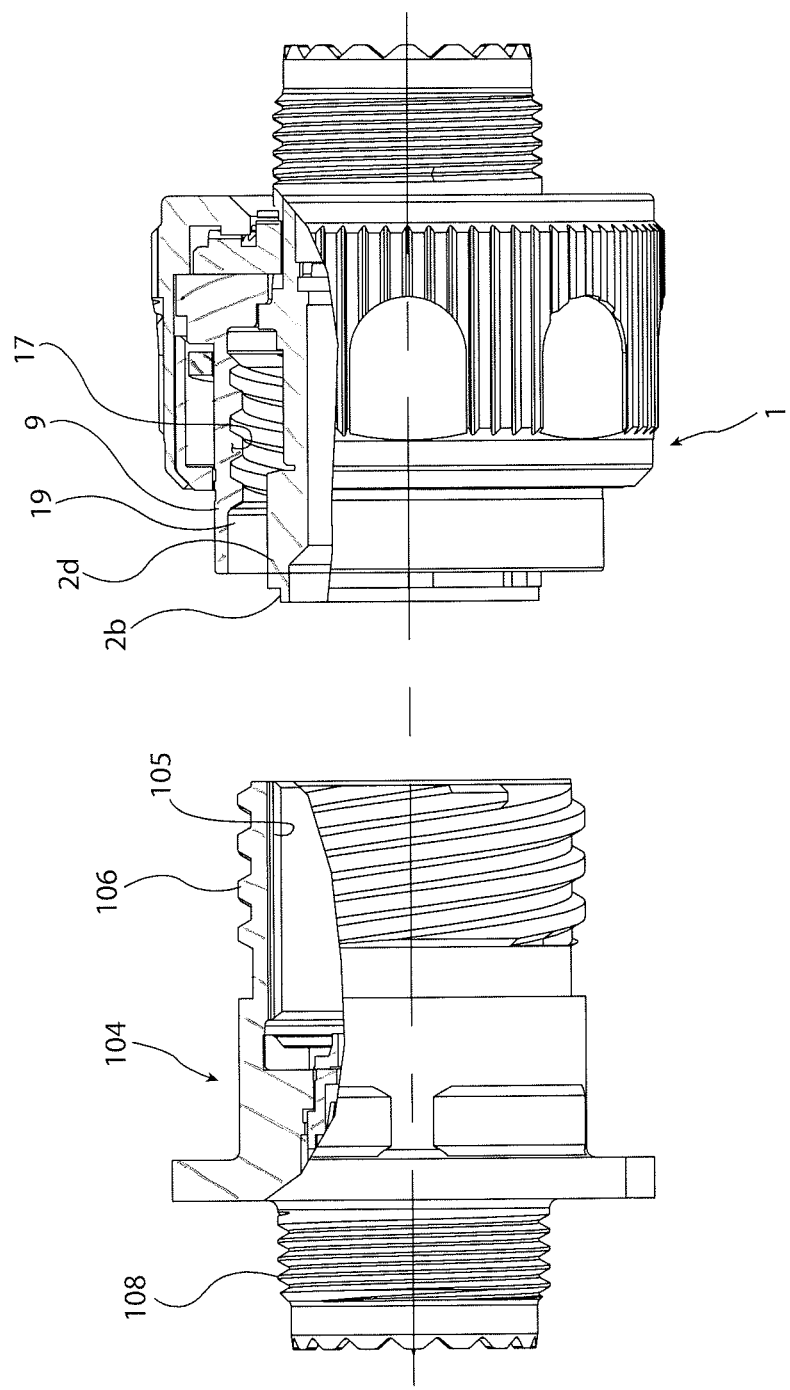
FIG. 10 depicts a mating connector that is configured to mate with the connector of FIG. 1.

FIGS. 1-8 depict a connector 1 that is capable of withstanding vibration or other external forces without uncoupling. The connector 1 may also be referred to as an adapter or a coupler. The connector 1 is shown in FIG. 10, for example, releasably mating to a mating connector 104. The connector 1 may be used in various applications, such as a fluid application or an electrical application.

Unless otherwise noted, each of the components of the connector 1 has a substantially cylindrical shape that is revolved about a longitudinal axis 'A' and each of the components has a substantially hollow interior. Also, as used herein, the term 'distal' refers to a position either at or toward a first end 2a of a connector body 2, and the term 'proximal' refers to a position either at or toward the second end 2b of the connector body 2.

The connector 1 includes connector body 2 upon which the remaining components of the connector 1 are mounted either directly or indirectly.

Connection means 2c are provided on the outer surface of the first end 2a of the connector body 2 for releasably mating with a backshell (not shown) or a strain relief (not shown), for example. According to this exemplary embodiment, the connection means 2c are male mechanical threads. The connection means 2c could be, for example, female mechanical threads, a bayonet connection, a clip, a clamp, a fastener, a post, a prong, a spring, a ring, a friction fit, or an adhesive. A bayonet-style connection is shown in U.S. Pat. No. 3,478,302, for example, which is incorporated by reference herein in its entirety.

As best shown in FIG. 10, the second end 2b of the connector body 2 includes a series of axially-extending lugs 2d that are slidably positioned within axially-extending channels 105 (one shown) of the mating connector 104. Engagement between the lugs 2d and the channels 105 permit axial translation, yet prevent relative rotation, between the connector body 2 and the mating connector 104. It should be understood that the connector body 2 could include the channels and the mating connector 104 could include the lugs to achieve the same result.

The interior region of the connector body 2 is hollow and the hollow space could be used to accommodate a cable (not shown) passing therethrough, for example. The cable could contain one or more wires or a passage for fluid for example. As another alternative, the hollow interior region of the connector body 2 could be used for the passage of fluid.

The connector body 2 includes three axially extending channels 5 formed on its exterior surface. The channels 5 are evenly spaced apart about the circumference of the body 2. The channels 5 interact with a ratchet ring 4 to prevent relative rotations between the body 2 and the ring 4. The connector body 2 also includes a recess formed on its outer surface in which a retaining ring 3 is fixedly positioned. The purpose of the retaining ring 3 and the channels 5 will be described hereinafter.

The ratchet ring 4 is radially positioned between the outer sleeve 8 and the connector body 2, and is axially positioned between the inner sleeve 9 and the outer sleeve 8. The ratchet ring 4 is positioned over the revolved exterior surface of the connector body 2 such that the ratchet ring 4 is fixedly connected to the body 2. The ratchet ring 4 is incapable of rotation and translation with respect to the body 2. More particularly, the ratchet ring 4 is incapable of translating upon the surface of the body 2 and along the longitudinal axis "A" because the ring 4 is sandwiched, along with an inner sleeve 9, between the retaining ring 3 and a shoulder 2e (see FIG. 4) that is formed on an exterior surface of the body 2.

Figure 6:
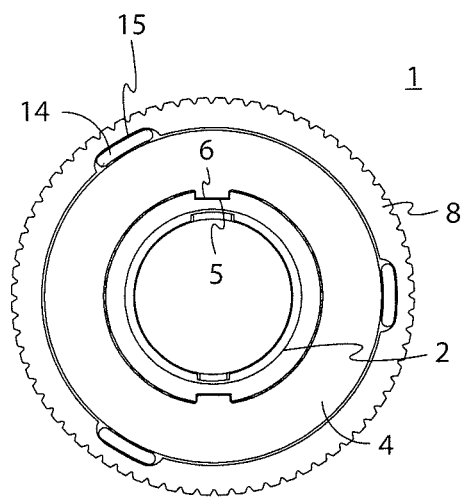
FIG. 6 is a cross-sectional view of the connector taken along the lines 6-6 in FIG. 5.
Figure 7:
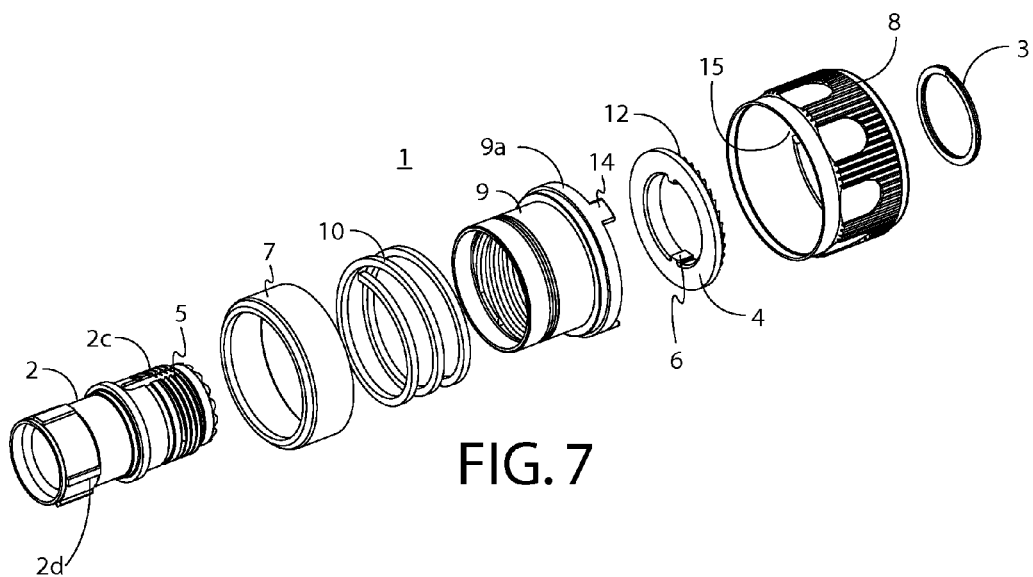
FIGS. 7 and 8 are exploded views of the connector of FIG. 1 taken from rear and front perspectives.
Figure 8:
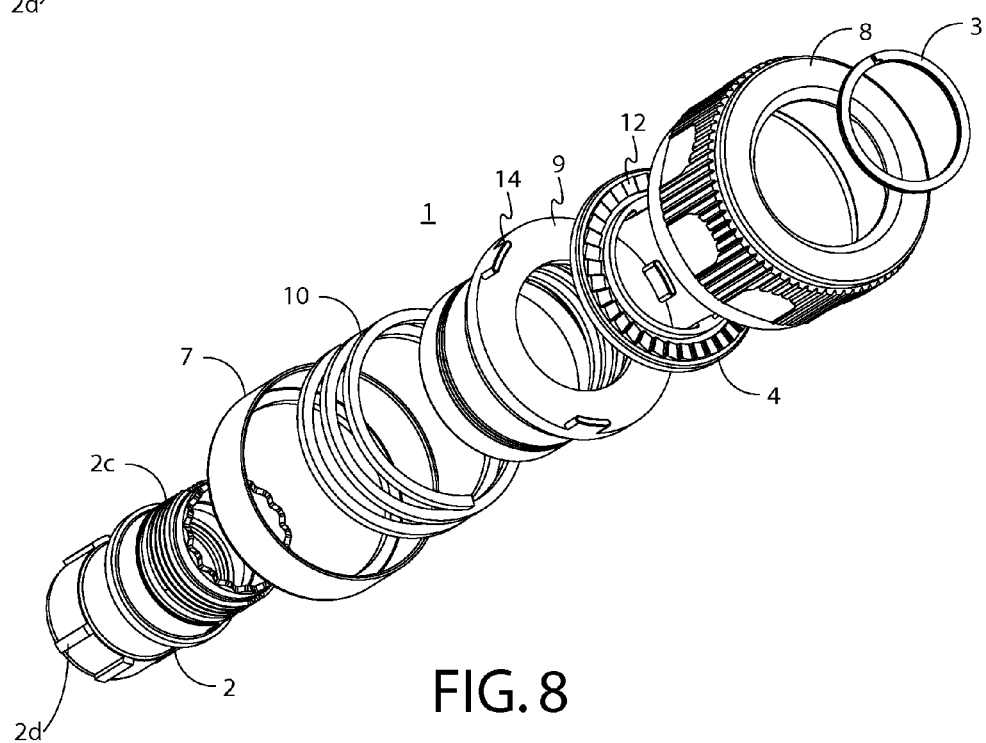

As best shown in FIG. 6, the ratchet ring 4 is incapable of rotating upon the surface of the body 2 and about the longitudinal axis "A" because the ring 4 is keyed to the body 2. More particularly, the ratchet ring 4 includes three lugs 6 which are positioned within respective channels 5 on the body 2. Engagement between the lugs 6 and the channels 5 prevent rotation of the ratchet ring 4 about axis "A" with respect to the connector body 2.

Each lug 6 extends in a radial direction toward the longitudinal axis "A". The lugs 6 are evenly spaced apart about the circumference of the ratchet ring 4. It should be understood that the number and position of the lugs 6 and the channels 5 may vary so long as the lugs 6 and channels 5 cooperate together to prevent rotation of the ratchet ring 4 with respect to the connector body 2. Also, although not shown, it should be understood that the lugs 6 could be provided on the body 2 and the channels 5 could be provided on the ratchet ring 2 to achieve the same result.

A series of ratchet teeth 12 are provided on the distal end of the ratchet ring 4. The teeth 12 are evenly spaced about the circumference of the ratchet ring 4. Each ratchet tooth 12 is formed in the shape of a right triangle having a straight edge and a sloped edge. The ratchet teeth 12 engage mating ratchet teeth 13 on an outer sleeve 8, as will be described with respect to the outer sleeve 8.

An inner sleeve 9 is mounted to the outer surface of the connector body 2 such that it is capable of rotating freely on the surface of the connector body 2. The inner sleeve 9 is radially positioned between the outer sleeve 8 and the connector body 2, and is axially positioned between the ratchet ring 4 and the shoulder 2e of the connector body 2. The inner sleeve 9 is incapable of translating along the longitudinal axis "A," with respect to the connector body 2 (or any other component of the coupling 1). The inner sleeve 9 is incapable of translation because it is sandwiched, along with the ratchet ring 4, between the retaining ring 3 and the shoulder 2e (see FIG. 4) that is formed on the exterior surface of the body 2.

Connection means 17 are provided on the inner revolved surface of the inner sleeve 9 for releasably mating with the connection means 106 of the mating connector 104 (see FIG. 10). Upon mating the mating connector 104 with the connector 1, the mating connector 104 is at least partially positioned within the annular space 19 (see FIG. 4) that is defined between the body 2 and the inner sleeve 9. According to this exemplary embodiment, the connection means 17 and 106 are mechanical threads. The connection means could be, for example, a bayonet connection, a clip, a clamp, a fastener, a post, a prong, a spring, a ring, a friction fit, or an adhesive.

As best shown in FIGS. 5-8, the outer surface of the inner sleeve 9 includes an outwardly extending shoulder 9a and three outwardly extending lugs 14. Each lug 14 extends from the shoulder 9a in an axial direction toward the distal end of the inner sleeve 9. The lugs 14 are evenly spaced apart about the circumference of the inner sleeve 9. The inner sleeve 9 interacts with an outer sleeve 8, as will be described hereinafter.

The outer sleeve 8 is positioned over the circumference of the inner sleeve 9 such that the outer sleeve 8 is slidably, but non-rotatably, connected to the inner sleeve 9. The outer surface of the outer sleeve 8 includes serrations 8a and cutouts 8b formed therein to enhance manual gripping of the outer sleeve 8 by a user of the coupling connector 1. The outer surface of the outer sleeve 8 may also be referred to herein as a gripping surface.

The outer sleeve 8 includes three axially extending channels 15 formed on its interior surface. The channels 15 are evenly spaced apart about the inner circumference of the outer sleeve 8. Each channel 15 is sized to receive a lug 14 of the inner sleeve 9. The keyed engagement between the lugs 14 and the channels 15 permits sliding of the outer sleeve 8 over the inner sleeve 9 in an axial direction (i.e., along axis "A"), while preventing rotation of the outer sleeve 8 with respect to the inner sleeve 9 (i.e., about axis "A"). Thus, the inner sleeve 9 and the outer sleeve 8 rotate together with respect to the ratchet ring 4 and the body 2, which are rotationally fixed with respect to the sleeves 8 and 9.

It should be understood that the number and position of the lugs 14 and the channels 15 may vary so long as the lugs 14 and the channels 15 cooperate together to permit sliding of the outer sleeve 8 over the inner sleeve 9, yet prevent rotation of the outer sleeve 8 with respect to the inner sleeve 9. Stated differently, the inner sleeve 9 and the outer sleeve 8 must rotate together. Also, although not shown, it should be understood that the lugs 14 could be provided on the outer sleeve 8 and the channels 15 could be provided on the inner sleeve 9 to achieve the same result.

A series of teeth 13 are formed on an interior facing surface on the distal end of the outer sleeve 8. The teeth 13 are evenly spaced about the circumference of the outer sleeve 8. Like the teeth 12 of the ratchet ring 4, each ratchet tooth 13 is formed in the shape of a right triangle having a straight edge and a sloped edge.

Figure 1:
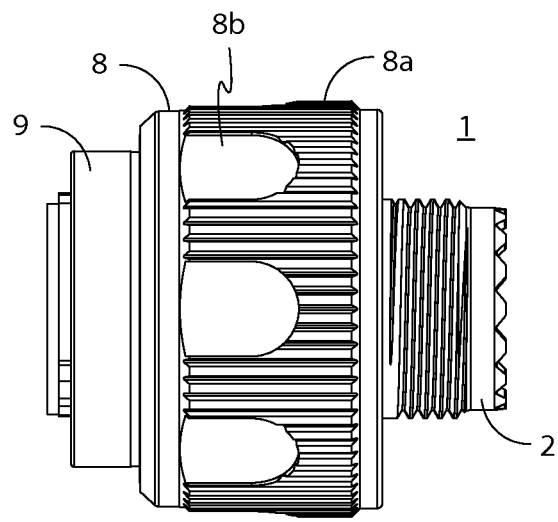
FIG. 1 is an elevation view taken from the left hand side of a connector according to one exemplary embodiment of the invention.
Figure 2:
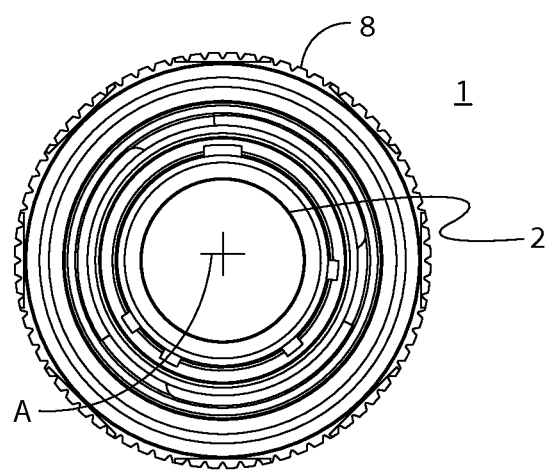
FIG. 2 is a front elevation of the connector of FIG. 1.
Figure 3:
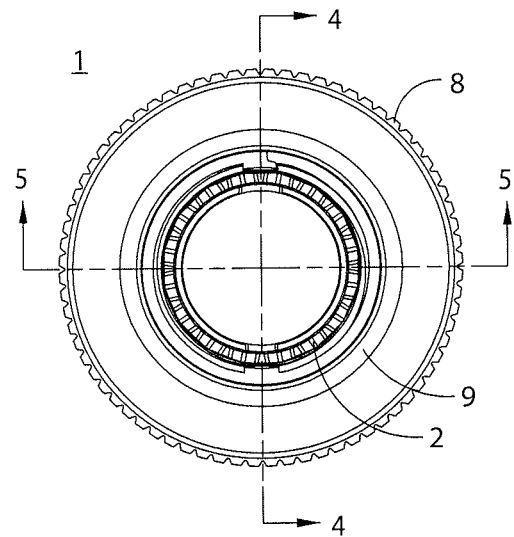
FIG. 3 is a rear elevation of the connector of FIG. 1.
Figure 4:
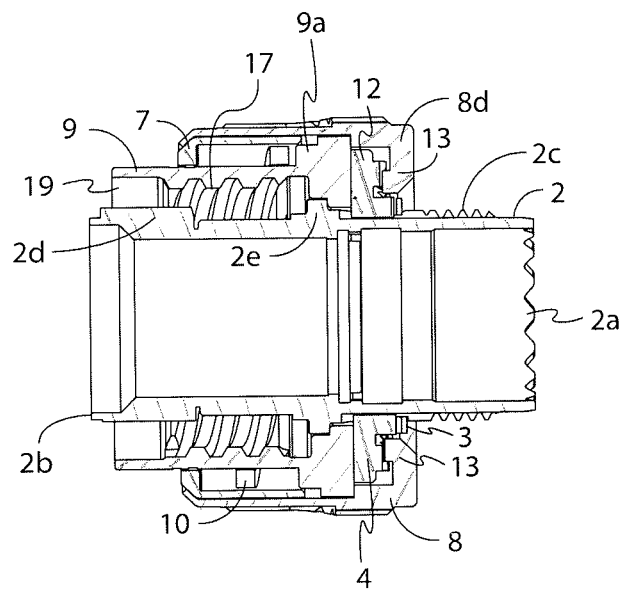
FIG. 4 is a cross-sectional view of the connector taken along the lines 4-4 in FIG. 3.
Figure 5:
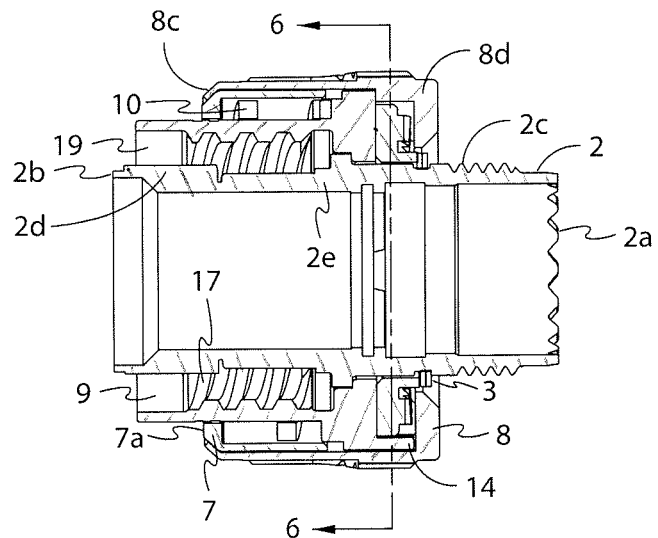
FIG. 5 is a cross-sectional view of the connector taken along the lines 5-5 in FIG. 3.

As shown in FIGS. 4 and 5, the proximal end 8c of the outer sleeve 8 curves inwardly toward the longitudinal axis to encapsulate a spring retainer 7. The spring retainer 7 is a cylindrical sleeve that is provided to captivate a spring 10 within the connector 1. Like the outer sleeve 8, the proximal end 7a of the spring retainer 7 is rolled inwardly toward the longitudinal axis to encapsulate the spring 10. The spring retainer 7 is slidably positioned between the inner sleeve 9 and the outer sleeve 8. The proximal end 7a of the spring retainer 7 can slide along the surface of the inner sleeve 9. The spring retainer 7 may or may not be rotationally keyed to the sleeves 8 and 9. The revolved interior surface of the spring retainer 7 rests on the outer surface of the inner sleeve 9 such that the spring 10 may not be disassembled from the connector 1. It should be understood that the spring retainer 7 may be integrated with the proximal end 8c of the outer sleeve 8 to achieve the same purpose.

As best shown in FIG. 4, the spring 10 is a resilient compression spring that is sandwiched between the proximal end 7a of the spring retainer 7 and the shoulder 9a of the inner sleeve 9. The spring 10 is configured to bias the teeth 13 of the outer sleeve 8 against the teeth 12 of the ratchet ring 4. Simply stated, the spring 10 is configured to urge the outer sleeve 8 to a locked position in which the teeth 12 and 13 are engaged with each other.

Stated differently, the spring 10 urges the outer sleeve 8 in a proximal direction (by way of the spring retainer 7), while it also urges the shoulder 9a of the inner sleeve 9 in a distal direction. The shoulder 9a of the inner sleeve 9 consequently urges the ratchet ring 4 in a distal direction against the interior surface of the proximal end 8d of the outer sleeve 8. Thus, the teeth 12 of the ratchet ring 4 are biased against the teeth 13 of the outer sleeve 8.

FIG. 10 depicts the connector 1 aligned and ready for mating with the mating connector 104. The mating connector 104 includes a cylindrical body having connection means 106 on one end of the connector 104 for mating with the connection means 17 on the inner sleeve 9, as previously described, and another connection means 108 on an opposite end of the connector 104 for mating with a backshell (not shown) or a strain relief (not shown), for example.

Axially extending channels 105 (one shown) are disposed on the interior surface of the end of the mating connector 104 for slidably receiving lugs 2d on the connector body 2. Engagement between the lugs 2d and the channels 105 permits relative translation, while preventing relative rotation, between the connector body 2 and the mating connector 104.

It should be understood that since the inner sleeve 9 is capable of rotation with respect to the connector body 2, the inner sleeve 9 is also capable of rotation with respect to the mating connector 104. More particularly, the inner sleeve 9 can be rotated onto the connection means 106 of the mating connector 104 (or vice versa) in a tightening direction without manually moving the outer sleeve 8, however, the inner sleeve 9 cannot be rotated onto the connection means 106 of the mating connector 104 (or vice versa) in a loosening direction without manually moving the outer sleeve 8 in the direction shown in FIG. 9B. In other words, once the connector 1 is mated to the mating connector 104, a user must first pull the outer sleeve 8 in the direction shown in FIG. 9B, and then rotate the outer sleeve 8 in a loosening direction to uncouple the connector 1 from the mating connector 104.

Referring now to the operation of the connector 1, the connector 1 is connected to the mating connector 104 by performing the following steps: (a) manually aligning the lugs 2d of the body 2 within respective channels 105 of the mating connector 104; (b) manually engaging the connection means 17 of the inner sleeve 9 with the connection means 106 of the mating connector 104; and (c) manually rotating the outer sleeve 8 (which in turn rotates the inner sleeve 9) in a tightening direction, consequently engaging the connection means 17 of the inner sleeve 9 with the connection means 106 of the mating connector 104.

During rotation step (c), the mating connector 104 translates in an axial direction toward the connector body 2 (or vice versa) without rotating by virtue of the keyed engaged between the lugs 2d and the channels 105. During rotation step (c), the teeth 13 of the outer sleeve 8 are engaged with the teeth 12 of the ratchet ring 4 by virtue of the biasing spring 10. Rotating the outer sleeve 8 in the tightening direction causes the sloped surfaces of the teeth 12 and 13 to slide past each other, thereby permitting rotation of the outer sleeve 8 with respect to the connector body 2 and the mating connector 104 (i.e., assuming that the mating connector 104 is fixed in place and prevented from rotation). As the teeth 12 and 13 slide past each other, the outer sleeve 8 moves slightly forwards and backwards in an axial direction. Rotation of the outer sleeve 8 in the tightening direction is possible until the connection means 17 of the connector 1 is fully engaged with the connection means 106 of the mating connector 104.

The connector 1 is then maintained in the locked configuration, and it cannot be detached from the mating connector 104 without manual intervention by an end user. In the locked configuration, the sleeves 8 and 9 are prevented from inadvertently rotating in a loosening rotational direction with respect to the connector body 2 and the mating connector 104 due to vibration or other external forces. Attempting to rotate the outer sleeve 8 in the loosening rotational direction while the outer sleeve 8 is maintained in the locked configuration, either purposefully or inadvertently, causes the flat surfaces of the teeth 12 and 13 to bear on each other by virtue of the spring 10, thereby preventing rotation of the outer sleeve 8 and the inner sleeve 9 in the loosening direction with respect to the connector body 2 and the mating connector 104. Thus, the connector body 2 and the mating connector 104 are each prevented from rotating in the loosening rotational direction with respect to the inner sleeve 9, or vice versa, thereby preventing detachment of the mating connector 104 from the connector 1.

Figure 9A:
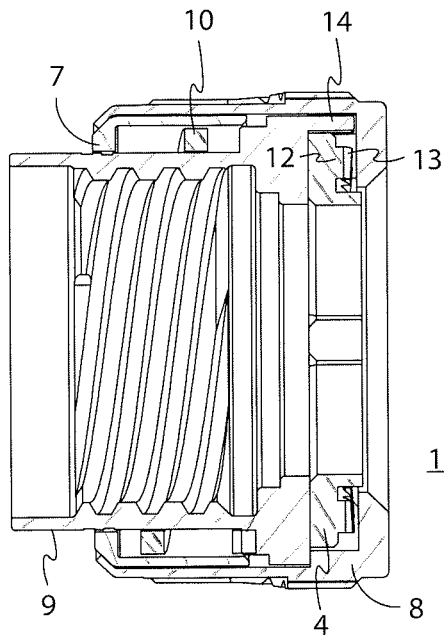
FIGS. 9A and 9B are cross-sectional views, like the view in FIGS. 4 and 5, of the connector (connector body omitted) shown in locked and unlocked configurations, respectively.
Figure 9B:
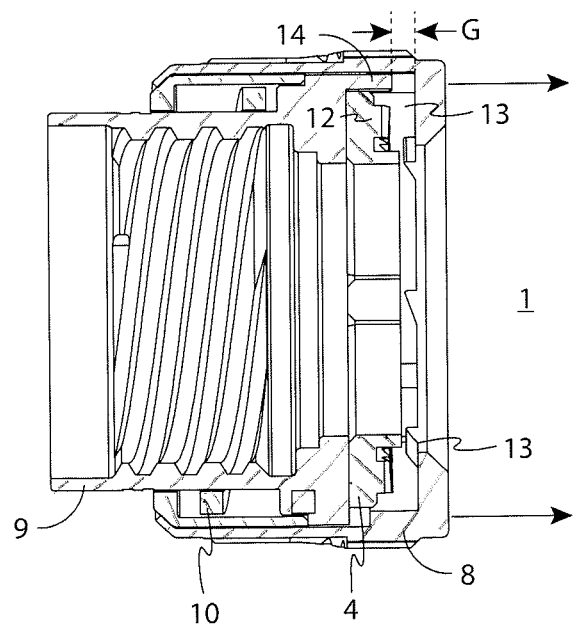

To detach the mating connector 104 from the connector 1, it is necessary to first move the outer sleeve 8 from the locked configuration of FIG. 9A to the unlocked configuration of FIG. 9B by pulling the outer sleeve 8 in the distal direction (see arrows in FIG. 9B) against the force of spring 10. This causes the teeth 13 of the outer sleeve 8 to separate from the teeth 12 of the ratchet ring 4. Once the teeth 12 and 13 are separated, the outer sleeve 8 is rotated in the loosening direction. Rotating the outer sleeve 8 in the loosening direction causes the inner sleeve 9 to rotate with respect to the connector body 2 and the mating connector 104, thereby causing the connection means 17 of the inner sleeve 9 to separate and detach from the connection means 106 of the mating connector 104. As the outer sleeve 8 and the inner sleeve 9 are rotated in the loosening direction, the mating connector 104 and the connector body 2 translate away from each other, and without relative rotation, by virtue of the keyed engaged between the lugs 2d and the channels 105.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A connector for releasably connecting with a mating connector, comprising:
   a connector body;
   a first sleeve rotatably coupled to said connector body and configured to connect to the mating connector;
   a second sleeve receiving said first sleeve and being movable axially between an engaged position and a disengaged position, said second sleeve having a plurality of teeth extending from a surface thereof;
   a ratchet ring positioned on said connector body, said ratchet ring having a plurality of teeth corresponding to said plurality of teeth of said second sleeve, said ratchet ring radially positioned between the second sleeve and the connector body, and said ratchet ring axially positioned between said first sleeve and said second sleeve; and
   a biasing member biasing said second sleeve to said engaged position,
   wherein said teeth of said ratchet ring engage said teeth of said second sleeve when said second sleeve is in said engaged position such that said first and second sleeves are not rotatable with respect to said connector body in one rotational direction and said first and second sleeves are rotatable with respect to said connector body in an opposite rotational direction, and said teeth of second sleeve being spaced from said teeth of said ratchet ring when said second sleeve is in said disengaged position such that said first and second sleeves are rotatable with respect to said connector body and the mating connector in both rotational directions.

2. The connector of claim 1, wherein an outer surface of the second sleeve includes a gripping surface for grasping by a user of the connector.

3. The connector of claim 1, wherein the first and second sleeves are rotationally keyed to each other such that neither of the sleeves can rotate with respect to the other sleeve in either the engaged position or the disengaged position of the second sleeve.

4. The connector of claim 1, wherein said biasing member is positioned between said first and second sleeves.

5. The connector of claim 1, wherein said second sleeve is axially moveable with respect to said first sleeve.

6. The connector of claim 1, wherein said second sleeve is proximal to said ratchet ring in said engaged position and distal to said ratchet ring in said disengaged position.

7. The connector of claim 1, wherein said ratchet ring is rotationally fixed to said connector body.

8. The connector of claim 1, wherein said first sleeve is axially stationary with respect to said connector body.

9. A connector comprising:
   a connector body;
   a first sleeve rotatably coupled to said connector body;
   a second sleeve defining an interior space in which said first sleeve is positioned, said second sleeve being movable axially with respect to said connector body between an engaged position and a disengaged position, said second sleeve having a plurality of teeth extending from a surface thereof;
   a ratchet ring positioned on said connector body, said ratchet ring having a plurality of teeth corresponding to said plurality of teeth of said second sleeve, said ratchet ring radially positioned between the second sleeve and the connector body, and said ratchet ring axially positioned between said first sleeve and said second sleeve; and
   a biasing member biasing said second sleeve to said engaged position,
   wherein said teeth of said ratchet ring engage said teeth of said second sleeve when said second sleeve is in said engaged position thereby preventing rotation of said first and second sleeves with respect to the connector body in one rotational direction and said first and second sleeves are rotatable with respect to said connector body in an opposite rotational direction,
   wherein to move said second sleeve from said engaged position to said disengaged position, in which the first and second sleeves are rotatable with respect to the connector body in both rotational directions, said second sleeve is moved away from said ratchet ring to separate said teeth of said second sleeve from said teeth of said ratchet ring.

10. A connector according to claim 9, wherein said teeth of said ratchet ring and said teeth of said second sleeve form a one-way ratchet such that in said engaged position said second sleeve is rotatable with respect to said connector body in said one rotational direction.

11. The connector of claim 9, wherein an outer surface of the second sleeve includes a gripping surface for grasping by a user of the connector.

12. The connector of claim 9, wherein the first and second sleeves are rotationally keyed to each other such that neither of the sleeves can rotate with respect to the other sleeve in either the engaged position or the disengaged position of the second sleeve.

13. The connector of claim 9, wherein said second sleeve is proximal to said ratchet ring in said engaged position and distal to said ratchet ring in said disengaged position.

14. The connector of claim 9, wherein said ratchet ring is rotationally fixed to said connector body.

15. The connector of claim 9, wherein said first sleeve is axially stationary with respect to said connector body.

16. A connector comprising:
   a connector body;
   a first sleeve rotatably coupled to said connector body;
   a second sleeve defining an interior space in which said first sleeve is positioned, said second sleeve being movable axially with respect to said connector body between an engaged position and a disengaged position, said second sleeve having a plurality of teeth extending from a surface thereof;
   a ratchet ring arranged on said connector body such that the ratchet ring is axially fixed and non-rotatable with respect to said connector body, said ratchet ring having a plurality of teeth corresponding to said plurality of teeth of said second sleeve, said ratchet ring radially positioned between the second sleeve and the connector body, and said ratchet ring axially positioned between said first sleeve and said second sleeve; and
   a biasing member biasing said second sleeve to said engaged position,
   wherein said teeth of said ratchet ring engage said teeth of said second sleeve when said second sleeve is in said engaged position, and said teeth of second sleeve being spaced from said teeth of said ratchet ring when said second sleeve is in said disengaged position,
   wherein each tooth of the second sleeve and the ratchet ring includes a straight edge extending parallel to the longitudinal axis and a sloped edge that intersects the straight edge, and, in said engaged position of said second sleeve, the sloped edges of mating teeth are configured to rotate past each other in one rotational direction of the second sleeve while the straight edges of mating teeth are configured to bear on each other to prevent rotation in an opposite rotational direction of the second sleeve.

17. The connector of claim 16, wherein an outer surface of the second sleeve includes a gripping surface for grasping by a user of the connector.

18. A connector according to claim 16, wherein said teeth of said ratchet ring and said teeth of said second sleeve form a one-way ratchet such that said second sleeve is rotatable with respect to said connector body in only a single direction.

19. The connector of claim 16, wherein the first and second sleeves are rotationally keyed to each other such that neither of the sleeves can rotate with respect to the other sleeve in either the engaged position or the disengaged position of the second sleeve.

\* \* \* \* \*